United States Patent

[11] 3,577,127

[72] Inventors David A. Bishop
Austin;
David W. Terry, Georgetown, Tex.; John E. Jones, Raleigh, N.C.; Roderick S. Heard; William H. Davis, Lexington, Ky.

[21] Appl. No. 724,552
[22] Filed Apr. 26, 1968
[45] Patented May 4, 1971
[73] Assignee International Business Machines Corporation
Armonk, N.Y.

[54] COMPOSER SYSTEM FOR PROCESSING DATA IN PARALLEL COLUMNS

35 Claims, 14 Drawing Figs.

[52] U.S. Cl. .......... 340/172.5
[51] Int. Cl. .......... G06f 15/06, G06f 15/46
[50] Field of Search .......... 340/172.5; 235/157

[56] References Cited
UNITED STATES PATENTS

| | | | |
|---|---|---|---|
| 3,165,045 | 1/1965 | Troll | 340/172.5X |
| 3,171,592 | 3/1965 | Hanson | 340/172.5X |
| 3,299,408 | 1/1967 | Wang et al. | 340/172.5 |
| 3,307,154 | 2/1967 | Garth et al. | 340/172.5 |
| 3,332,617 | 7/1967 | Higonnet et al. | 340/172.5X |

*Primary Examiner*—Paul J. Henon
*Assistant Examiner*—Sydney Chirlin
*Attorneys*—Hanifin and Jancin and D. Kendall Cooper

ABSTRACT: The invention concerns composing systems including techniques and apparatus for achieving justification of columnar data. In one version, Method A, the system derives columnar data from a source media, such as the familiar "-Presswire" paper tape having pairs of text columns arranged in successive justified lines, recognizes the occurrence of a code in the media identifying the center of the line between the two columns, if such occurs within a certain range, compares the line center code with a predetermined range about the center location of a previously entered line measure, and develops the necessary justification routines to insure that each of the double columns in successive lines is justified to a standard width thereby insuring that the gutter (or white space) between the column segments is of a uniform width and has straight edges. In a second version, Method B, data derived from the tape media is also scanned to determine the occurrence of the line center in successive lines, but the necessary justification routines for insuring a uniform placement of the gutter (or white space) is based upon a comparison of the center indicating code with a range about the center of the fixed width of both column segments in an individual line. The system readily accommodates a number of column segments greater than two in individual lines and column segments that differ in width. Also, it is receptive to input data derived from sources other than a paper tape media, and the output of the system, rather than being a printer, as described herein, can be any one of a number of composing entities, recording units, communicating units, or the like.

FIG. I
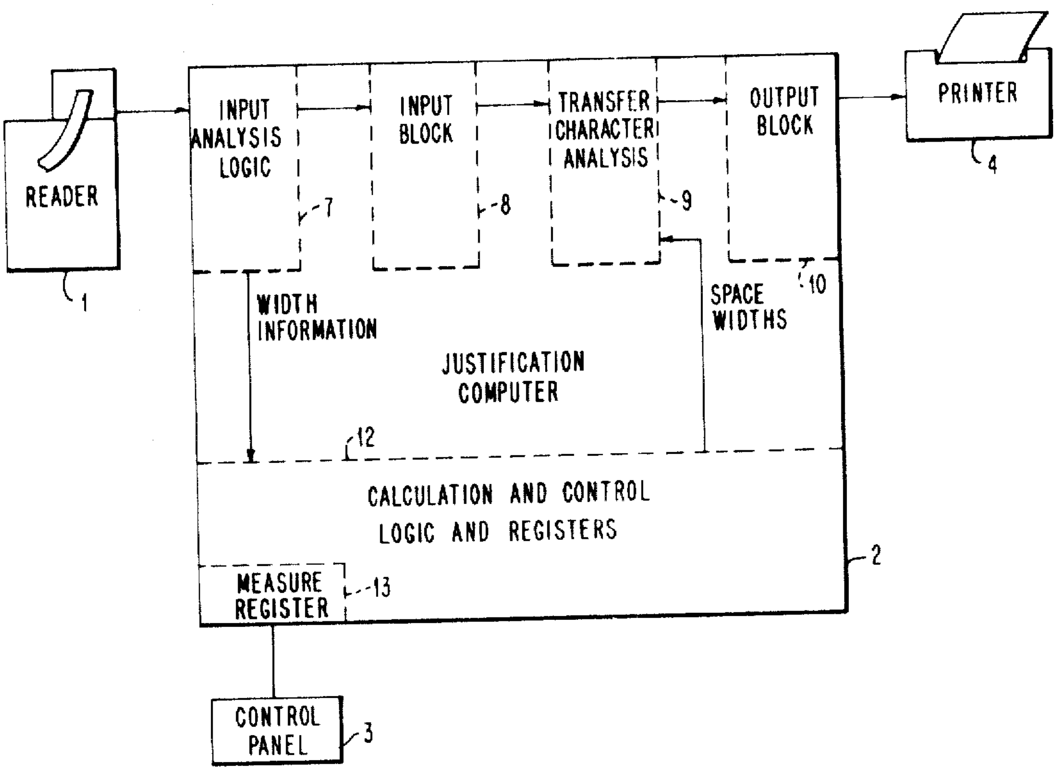
INVENTORS
DAVID A. BISHOP
WILLIAM H. DAVIS
RODERICK S. HEARD
JOHN E. JONES
DAVID W. TERRY
BY D. Kendall Cooper
ATTORNEY

COMPOSER SYSTEM FOR PROCESSING DATA IN PARALLEL COLUMNS

REFERENCES

IBM "Selectric"* Composer Instruction Manual, Form No. 549–0050, copyright 1966.

IBM "Selectric"* Composer Customer Engineering Instruction Manual, Form No. 241-5340, copyright 1966.

IBM Magnetic Tape "Selectric"* Composer Customer Engineering Instruction Manual, Form No. 241-5430, copyright 1967.

* Registered Trademark

U.S. Pat. application Ser. No. 580,275 filed Sept. 19, 1966, now U.S. Pat. No. 3,404,766, with W. H. Castle, et al., as inventors, entitled "Variable Spacebar Mechanism for Automatically Operated Proportional Escapement Printer."

BRIEF BACKGROUND OF INVENTION, INCLUDING FIELD AND PRIOR ART

The field of the invention concerns composing systems in general, but especially systems of this nature that are used in the segment of the printing industry concerned with the processing of data arranged in parallel columnar format. Broadly speaking, newspapers and book publishers are continuously concerned with columnar data. The format of a newspaper usually contemplates the arrangement of news text in parallel columns across the page. Book publishers frequently make use of a similar format. As a further extension of the columnar-type data, much of the information encountered in newspaper work may comprise individual column segments within the standard column width. Examples of this are baseball box scores, or similar information.

Newspapers have formed several member organizations to gather and disseminate news, market reports, and other news matter. Communication is generally via teletype lines, using a modified five channel paper tape code. Two well-known organizations of this type are the Associated Press and the United Press International. The paper tape media used in the services is usually referred to as "Presswire." Actually, the paper tape media incorporates a sixth channel primarily included to define various informational and control characters or symbols.

Information sent over the communication lines is fed into two kinds of terminals. One of these, a printer, is located in the news room, and provides a hard copy for the editing staff. The other is a six channel punch located in the composing room close to the automatic tape-driven line casters. Systems of this nature were introduced in 1932 with the advent of the "Teletypesetter"* (TTS) tape perforator, (*registered trademark of the Fairchild Graphic Equipment Division of Fairchild Camera and Instrument Corp.)

The TTS tape is fed directly into automatic line casting equipment and because of this comes prejustified. That is, the tape has been composed on a Teletypesetter perforator and contains not only the actual text but identifying data and control codes for the line caster, and sufficient fixed and variable spaces so that when the line is cast it will be justified. The equipment of the nature just described, based on the Teletypesetter composition, assumes a modular font. This is an 18 unit system, the EM space being 18 units in size, the EN space being nine units in size and the Thin space being six units in size. Accordingly, EM equals two EN equals three Thin spaces. Justification in systems of this type is accomplished by manipulation (expansion) of space bands within individual lines.

Two formats are of primary interest. These are the full column and half-column formats. The full column format is used for stock listings, news text, and the like. The half column is used for mutual fund listings, race results, and the like. In some cases, information such as baseball box scores, are set as individual half columns but transmitted over the communication line as full columns of information. Such full columns could include a special code to identify the gutter space or center area between the two half-column segments, but frequently do not. The gutter or white space area between the half-column segments may be recognized by particular code sequences and in the case of box scores, for example, such sequences may be a pair of Thin space codes. When there is no special center identifying code, some difficulties may be encountered in recognizing the center of such full columns of information, since the code sequences indicative of the center white space area may also occur elsewhere in the line.

Frequently, it is desirable or necessary to make use of source media, such as the TTS "Presswire" paper tape, based on one unit width schedule in another system that is based on a different unit width schedule. Examples of the latter systems are the IBM "Selectric" Composer and the IBM Magnetic Tape "Selectric" Composer systems that are based on a unit width schedule providing nine units for the widest character. A characteristic difference between a TTS-type system and the IBM systems, as an example, is that the former make use of space band wedges to achieve uniformity in line widths, while the latter systems make use of spaces whose width is an integral multiple of the basic unit.

A portion of a typical box score will illustrate some of the problems encountered.

Box score A

| Los Angeles | ab | r | h | bi | Philadelphia | ab | r | h | bi |
|---|---|---|---|---|---|---|---|---|---|
| Wills, ss------ | 4 | 1 | 3 | 1 | Brandt, cf------------ | 2 | 0 | 0 | 0 |
| W. Davis, cf-- | 5 | 0 | 2 | 0 | Briggs, cf------------- | 1 | 1 | 0 | 0 |

An example of the coded version of one of the box score lines is as follows.

Box Score B

| | | | | | | | | | |
|---|---|---|---|---|---|---|---|---|---|
| Will(sp)ss ---- | 4 | 1 | 3 | 1 | (TS-TS) Brandt(sp)cf | 2 | 0 | 0 | 0 |

Referring to the Box Score line just presented, the two half columns beginning with "Wills" and "Brandt," respectively, are separated by two Thin spaces designated TS–TS. In developing the TTS tape, space or space band codes are inserted following the individual players' names. These codes are recognized by the equipment ultimately using the tape, such as line casting equipment, to position the space band elements or wedges for subsequent use in justifying the individual lines by expanding the space band wedges. Due to the nature of equipment such as the line casting equipment referred to, the expansion of the space band elements mechanically achieves equality of the individual half columns, the half columns being separated by white space of uniform size and predetermined location. This assumes that the utilizing equipment is based upon the same unit width schedule as the source media.

When the TTS tape is used in a system based upon a different unit width schedule, however, and a system that perhaps makes use of a printer as output, discrepancies occur in the setup lines produced by the system due to variances in the unit widths assigned to the different characters. In the TTS system, for example, the name "Wills" has unit values of 18–6–66–9, while in a system, such as the IBM systems previously referred to, the name "Wills" has unit values of 9–3–3 –3–4. Characters in the two different systems alluded to bear different proportional relationships to one another. Therefore, half columns that are balanced with respect to the centerlines in the TTS system may be come unbalanced about the centerline in the other type of system. In the TTS system, the space band areas in the individual half columns are of equal width. However, in a system like the IBM system, due to the differences in proportionality discussed, the space bandwidths may or may not be of equal value in order to compensate for the unbalance encountered.

Some prior systems develop media wherein the individual lines of data each carries justification information and may be identified by particular line ending sequences. In such systems when individual lines comprise two or more columns of information, uniform width of the columns in the lines is insured by providing justification information for each column, and the columns are justified on an individual basis.

SUMMARY OF INVENTION

In both Methods A and B, the system accepts input TTS Presswire tape, which is arranged for 18 unit linecaster escapement and automatically rearranges the character spacing to obtain proper alignment of double column data.

Since the TTS paper tape has a slightly different escapement arrangement than the escapement of the system described herein, the use of this input without modification will result in improper alignment of columns when using the parallel half-column format of baseball box scores, race results, etc. See FIG. *5a*. The input comes in from the Presswire tape in two separate half columns side-by-side which result in a full column of type on the linecaster. The center between the two half columns is indicated by a "double thin" space. This represents two small fixed space slugs. Since these may appear elsewhere in the copy, a "hot zone" is established in the center between the half columns and the present system recognizes a double thin appearing in this zone as the division between the two half columns. Upon recognizing this double thin, the first half column which has just been received is recalculated for proper alignment with the system spacing and printed out.

In Method A, as the first half column is printed out, the second half column is read in off the Presswire tape and recalculated to obtain proper alignment in the same manner. An attempt is made to locate the "double thin" space (TS–TS) within a range about the center of the "measure."

In Method B, the range is established about the center of the "fixed width" portion of the line. The entire line is read in and worked with to determine the justification required for each half column.

OBJECTS

Accordingly, an object of the present invention is to provide methods and apparatus for achieving justified columnar information.

Another object of the invention is to provide techniques for processing columnar data in systems using differing justification width bases.

Another object of the invention is to provide techniques and apparatus for a composing system to insure justified columnar data in one base derived from data in a different base.

Still another object of the invention is to establish compatibility between normally incompatible composing systems in order to insure correct processing of columnar information and derive properly justified columnar output.

In particular, an object of the present invention is to produce output signals or printed copy with accurately justified and centered columnar segments from input data oriented on a columnar-line format and with differing justification base.

The foregoing and other objects, features, and advantages of the invention will be apparent from the following more particular description of the preferred embodiments of the invention as illustrated in the accompanying drawings.

DESCRIPTION OF THE DRAWINGS

In the Drawings:

FIG. 1 is illustrative of a composing system that may operate in accordance with either of the column processing techniques described herein.

FIGS. *2a* and *2b*, illustrate a sequence chart and control circuits for a first column-processing method, designated Method A.

FIGS. *3a* and *3b* illustrate sequencing and control circuits for a second column-processing method, designated Method B.

FIGS. *4a—4e* illustrate various circuits that are useable with Method A or Method B dependent upon the particular control circuits activated in FIGS. *2b* and *3b*. Method A involves the Read mode, Check mode, Justify Calculation mode, and Transfer mode logic of FIGS. *4a* and *4c—4e*, while Method B includes the foregoing modes and, in addition, incorporates a Scan mode shown in FIG. *4b*.

FIGS. *5a*, *5b*, and *5c* illustrate printed columnar information, more particularly representative box scores derived from the TTS Presswire media with FIG. *5a* showing uncorrected output copy, FIG. *5b* showing output copy produced with Method A, and FIG. *5c* showing output copy produced with Method B according to the principles of the present invention.

Figures 5A, 5B, 5C, 6:
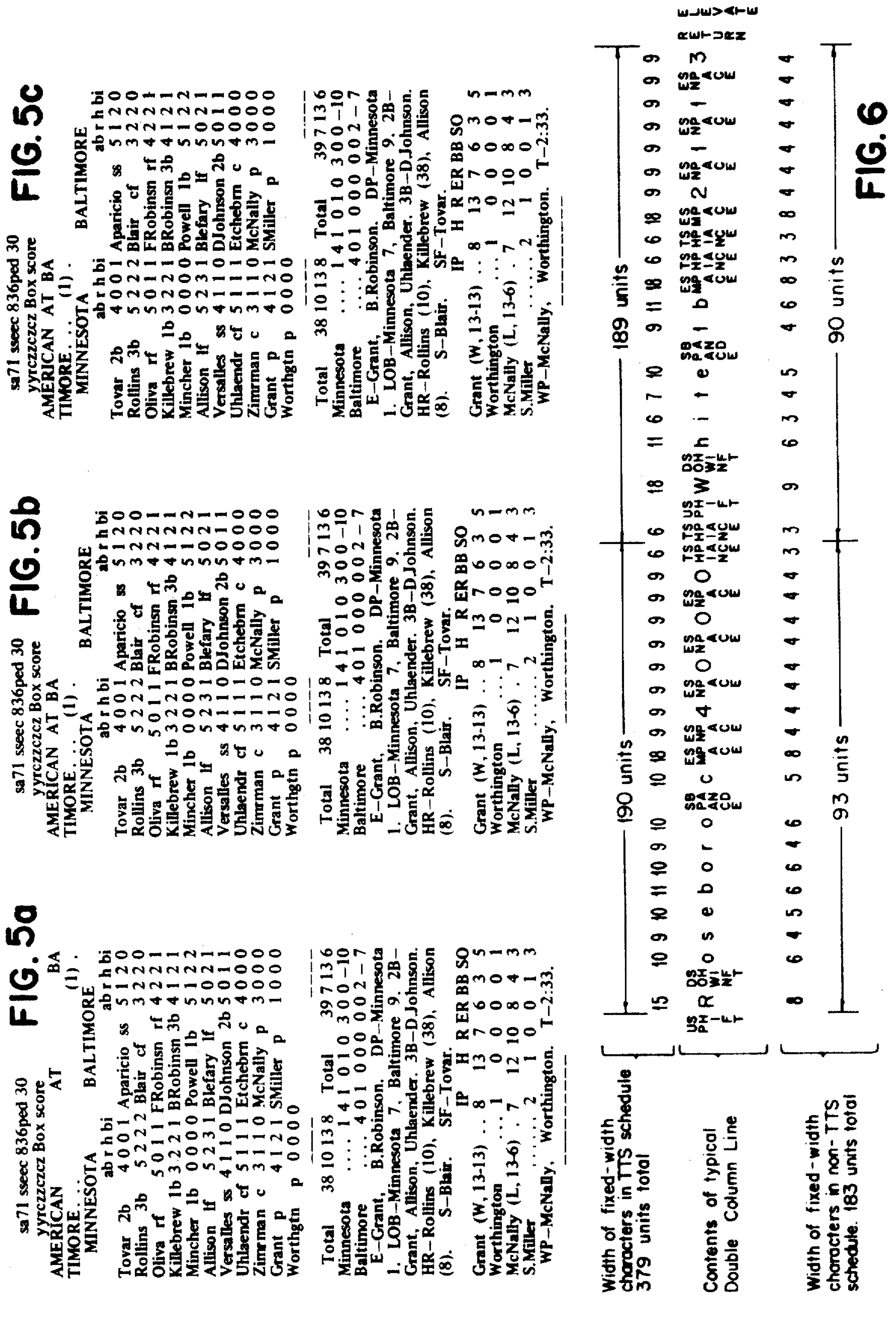

FIG. 6 illustrates a typical TTS box score line comprising two columns of information with a center white space area identified by a double Thin space combination. The TTS unit values and non-TTS unit values are indicated.

SYSTEM DESCRIPTION

FIG. 1 illustrates a composing machine system for deriving printed justified copy from an original source media, such as the TTS paper tape. The system comprises a number of units including a tape reader 1, a computer 2, a control panel 3, and a printer 4.

Computer 2 includes Input Analysis logic 7, Input Block (IB) 8, Transfer Character Analysis 9, Output Block (OB) 10, and Calculation and Control Logic and Registers 12 including a Measure Register 13.

Reader 1 is assumed to accommodate a tape designated TTS from which various data is derived, including full column and half-column data. As the information in the TTS tape is read, it is transferred to the Input Analysis Logic area 7 of Computer 2.

The system reads the characters from the reader into a register within the Input Analysis logic. Each character or space in a line is placed in Input Block 8. The system accumulates an entire line in the Input Block and as each character comes in accumulates width information in a Text Length Register 15. The width of each individual character is found by table lookup routines and added to this register. The circuit also keeps track of the number of spaces that occur. Once an entire line is read into Input Block 8, then the circuit calculates width information using a line measure value previously entered from control panel 3 in register 13 and the number of spaces encountered in the line. This will determine how wide the spaces should be in the final copy. Once the width of the spaces is determined, the circuit begins to transfer the characters from Input Block 8 to Output Block 10 going through Transfer Character Analysis logic in block 9. When the circuit reaches a space character, it is replaced by a No-Print character in the appropriate width to allow the right amount of space.

Input Block 8 and Output Block 10 are needed to handle the situation when a space is larger than 9 units. In such case, two or more spaces are substituted in place of one in the original data. If the source media is a magnetic tape, for instance, the circuit reads into the Input Block the upper case characters as indicated by a shift bit associated with each character. For output to the printer, it is necessary to have a discrete up-shift code. This has to be inserted before an upper case character. A down-shift code has to be put after it. This also takes up extra space, so that two blocks are needed.

The Justification logic for calculating the solution on double column data is included in the Calculation logic and Register area 12.

Generally, the data derived from Reader 1 is handled by the system on a line for line basis. An overlap occurs however, since when any particular line is transferred to Output Block 10 to be used for operating Printer 4, a next succeeding line can be received in Input Block 8 of the system. The reading of the next succeeding line to the Input Block follows the transfer of the preceding line from the Input Block to the Output Block.

Methods A and B — General

Alternative Methods A and B are disclosed herein for deriving justified columnar data in a utilizing system from TTS tape produced by another system having a different unit width schedule. Uncorrected copy when neither Method A or B is used is shown in FIG. 5*a*.

Methods A and B both operate by detecting the center of the copy as the TTS tape is read and recalculating the white space on either side of the center.

There are two objectives:

1. Detect the center of the copy — The center line is always defined by the tape originating unit, such as a computer, as two linotype "thins" (small fixed space slugs). Since the two thins (TS–TS) may conceivably appear elsewhere in the copy only the two thins appearing within a "hot-zone" close to the center of the copy are detected. Once these "thins" are found within the center hot-zone the system determines that it has located the center of the copy.

2. Recalculate the white space — the white space in either half-column consists of fixed spaces (thins, ems's, or ens's) and at least one variable space in each half (spacebands). Once the center of the copy has been determined in step (1) above the variable spaces in each half are recalculated for the escapement system of the system so that the two halves are exactly centered.

Method A

In Method A, the internal logic within the system detects two adjacent thin spaces and then checks to see if they lie in the center hot-zone. Once two thin spaces are found to be in the hot-zone, a change in the state of the control logic takes place and a specially calculated measure is inserted so that the justification solution for this half column can be calculated immediately and the characters placed in the output block. While this half column is printing out the second half is read in and justified. Thus, the two thin spaces have caused each half column to be handled as a separate input and output line of short measure. See FIG. 5*b* for output copy using Method A.

In many instances data is sent by AP and UPI as a half column of text only or as a half column of text and another half column of "fill charaters" to fill out the linotype line. The newspaper then cuts off the "fill lead" and shifts half columns to fill out a full column.

Recently, AP and UPI started a full computer operation which will make "fill lead" unnecessary. The computer sends the two half columns side-by-side so that the final result as cast on the linotype will produce the full column format desired.

Even though there will be a spaceband on the left side of the thin spaces for normal text, they may not be one for "fill characters." For this reason, a spaceband code is inserted when needed, to keep the second half column the correct width. This automatic spaceband insertion will also prevent errors of forgetting the spaceband from affecting the second half column.

Method B

Method B is preferable when two consecutive thin-space codes (TS–TS) are also used at other places in the text, although not necessarily immediately adjacent to the center. It is important to locate the sequence representing the true center.

Also, the text contains space band codes of indeterminate width. These are normally equal in number for each column and by the nature of the hot-type linecaster must represent equal expansion throughout the line.

The dimensions of two typical double column examples are as follows:

| Widths in non-TTS Units | Ex. 1 | Ex. 2 | Ex. 3 |
|---|---|---|---|
| Measure (11½ picas) | 184 | 184 | 184 |
| Width of characters and fixed spaces in left column | 84 | 80 | 87 |
| Width of characters and fixed spaces in right column | 82 | 89 | 78 |

Note that the fixed width of the left and right columns is always significantly less than half the measure. Also, the total fixed widths constitute a varying percentage of the measure. Method A, which attempts to locate TS–TS codes within a range about the center of the "measure," may miss such codes in some cases and identify, in some cases, TS–TS codes within the right column as column centers.

Method B defines a range (such as plus or minus five units) about the center of the "fixed width" portion of the line. For the three examples these centers are 83, 84½ and 82 ½ units, while the codes to be located are at 84, 80 and 87 units from the left, respectively.

FIG. 6 shows the contents of a typical double column TTS line. Note that, although the half columns are within one unit of balance in TTS units, they are out of balance by three of the larger non-TTS units, so that unequal widths must be assigned to space band codes. Note also that a second double thin space occurs within the second half column.

In Method B, the entire line is read before the total fixed width (and hence the center) can be determined. If any TS–TS codes are in the line, it is then determined which, if any, are within the allowed distance of the center. This may be done by scanning the line in storage, or by storing locations of TS–TS codes and accumulated widths at these locations as the line is read. Once the center code is determined, the left column must be justified on a measure equal to half the full measure. After the left column is printed and a gutter space is supplied to the output, the right column is justified and printed. Output copy with Method B is shown in FIG. 5*c*.

A step-by-step sequence for Method B is as follows:

1. Read in line, setting Double Thin Latch (DTL) when a double thin space is detected.

2. Upon receiving a Line End code, check DTL before going to Transfer. If DTL is on, scan the Input Block for Double Thin Spaces, checking each pair for distance from center based on half the accumulated Text Length (TL).

3. If Double Thin Space (DTS) is located within R units (R=5 in this case) of center, set up for transfer of this line in two (2) segments, justifying each half separately.

4. If no Double Thin Space is located within R units of center, turn off DTL and transfer the line as though no Double Thin Space had been received.

Determination of Double Thin Space within R units of center:

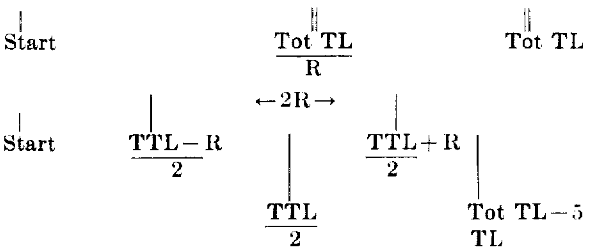

When Double Thin Space is located in Input Block, it will be used as double column divider if the following holds:

$$\frac{TTL}{2} - R \leq \text{Length at TS} \leq \frac{TTL}{2} + R$$

$$TTL - 2R \leq 2 \times \text{Length at TS} \leq TLL + 2R$$

$$\underbrace{TTL \leq 2 \times \text{Length at TS} + 2R}_{\text{First Check}} \leq TTL + 4R$$

$$\underbrace{2 \times \text{Length at TS} - 2R \leq TTL}_{\text{Second Check}}$$

In either method, one of the thins in the center is assigned to each half column as a fixed space defining half the gutter width. It is also possible to treat the center defining code or sequence as an entity having a predefined width. For instance, if a separate measure for half columns is entered, equal to less than one-half the full column measure, the gutter width is defined by the full column measure less twice the half column measure. In this case, neither of the center double thins would not be assigned to either half column.

Detailed Description of Method A

Figures 2A, 2B, 3A, 3B:
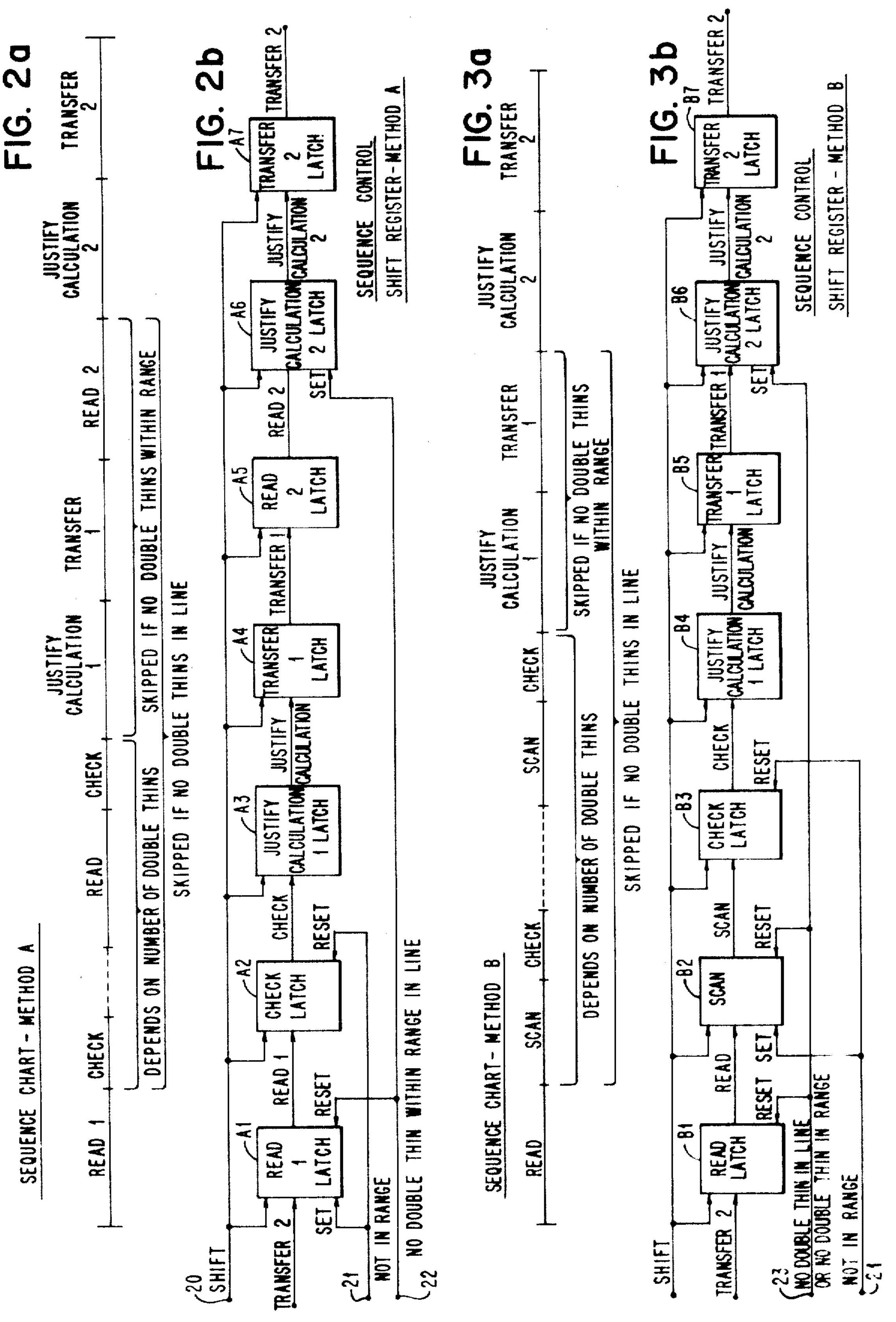

FIG. 2a gives the sequence of various modes established to implement a Double Column Justification with Method A. Referring again to FIG. 1, the system reads the data in, in a mode known as Read 1. If the system comes to a Double Thin Space (TS–TS) while it is reading, immediately it checks to see if it is within some predefined range about the center of the measure. If it is not, the system goes back to the Read 1 mode, continues to read, and goes into the Check mode whenever it again comes to a Double Thin Space. If a Double Thin Space is encountered within the proper range, the system goes to Justify Calculation 1 mode during which the proper size of the individual spaces is calculated in order to justify the first of the two half columns. This half column is then transferred to Output Block 10. Reading is now continued in the Read 2 mode, but since the center of the column has already been found and the first half column has already been justified and transferred, there is no need to check for the Double Thin Space.

When the end of a line is reached, the system goes into a Justify Calculation 2 mode and from this into Transfer 2 mode. When this is completed, the system is able to start the reading of the next line.

Some special cases arise. If there are no Double Thins in the line, the system will encounter the Line End during Read 1. In this case, there is no need to go through intermediate steps, and the system goes immediately to Justify Calculation 2. A slight difference occurs here in that, if a Double Thin is encountered in the proper range in the line, both Justify Calculations have to be made on the basis of a half measure, but if the system skips directly to Justify Calculation 2 without going through Justify Calculation 1, the full measure is used as entered from the control panel. If Double Thins are encountered, but none of them found to be within the appropriate range, the system still skips to Justify Calculation 2 when it reaches the end of the line, just as if there were no Double Thins at all in the line.

FIG. 2b implements this sequence of operations, and consists of a Shift Register which contains seven latches A1—A7. All the latches except one are off at any given time. A Shift pulse at terminal 20, in conjunction with the previous latch being on, will turn the succeeding latch to the right On and turn the previous one Off. Normally, the system would proceed directly from one state to the next upon occurrence of the Shift pulse. The exceptions to this are in case of a Check which did not result in the Double Thin being in the appropriate range. In this case, it is necessary to go back to the Read 1 condition. Thus, the Check latch must be reset and the Read 1 latch set without any Shift pulse being generated. This is done by means of a Not In Range signal at terminal 21. Another exception occurs if the machine is in Read 1 and encounters the Line End condition. It must skip immediately to Justify Calculation 2, so the Justify Calculation 2 latch is set and the Read 1 latch is reset by a signal referred to as No Double Thin Within Range In Line at terminal 22.

Figures 4A, 4B:
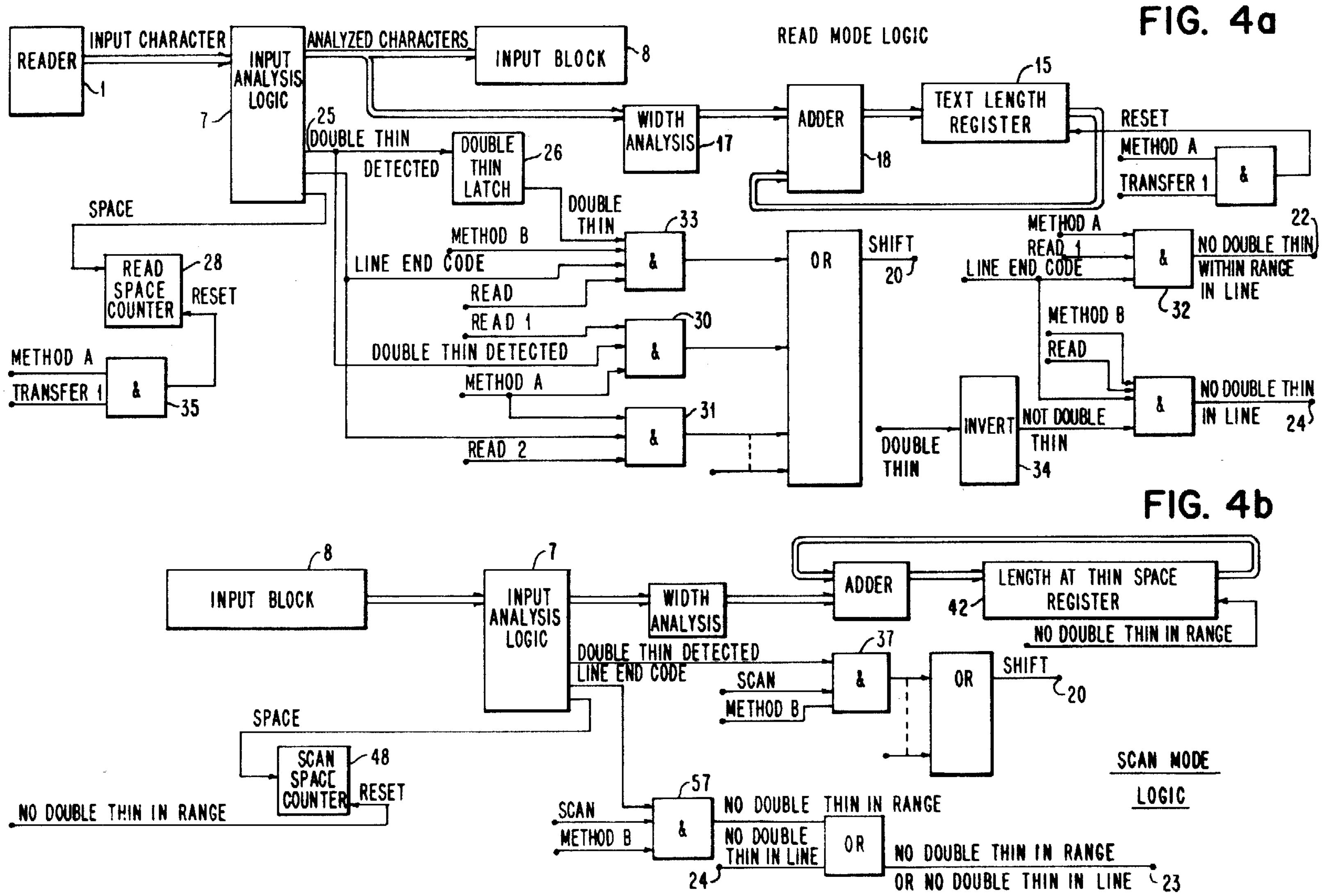

FIG. 4a is the Read Mode Logic. This covers the logic for both Read 1 and Read 2. Characters come from Reader 1 into the Input Analysis Logic 7. Most of the characters are sent directly into Input Block 8 where they are stored. Some are modified or ignored, such as Feed codes on the tape. In addition to transmitting characters to Input Block 8, the circuit feeds the character codes into a Width Analysis Block 17, from which the width of each character is added, by means of an Adder 18, to the Text Length Register 15 so that at any point in reading characters from the Reader, the Text Length Register reflects the fixed width of characters that have been read up to that point in the line.

The Input Analysis Logic 7, is capable of detecting Double Thin Spaces and generating a Double Thin Detected signal on line 25. The Double Thin Latch 26 is not used in Method A.

Input Analysis 7 also detects spaces. Although spaces are put into the Input Block as Spare codes, spaces are also treated in a special manner by keeping a count of how many spaces have been read. This count goes into the Read Space Counter 28. Normally, the Shift signal which causes the machine to sequence from either Read 1 to the Check mode or from Read 2 to the Justify Calculation 2 mode is the means of getting out of the Read mode. In Method A, this can occur in two ways. The Double Thin Detected signal in conjunction with Read 1 and Method A conditions AND (&) circuit 30 to generate the Shift signal at terminal 20 that takes the machine to the Check mode. If the machine is in the Read 2 mode, the Line End code in conjunction with Read 2 and Method A through AND circuit 31 generates the Shift signal. In a special case, it is necessary to reset the Read 1 latch if there is no Double Thin Within the Range in the Line and this signal is generated by Method A, Read 1 and Line End code from AND circuit 32. The Space Counter and the Test Length Register keep track of the spaces and the amount of fixed space in the line up to the point above the Read mode is left. If the system justifies the first half of the line as a separate column, the counters need to be reset before going into Read 2. This is done by a Method A signal and Transfer 1 signal to AND circuit 35. This is so, since if the machine has gone through the Transfer 1 state, it has done the justification on the first half column, and should be reset for the second half column. Otherwise, if the system had gone directly from Read 1 to Justify 2, or if the system had gone from Read 2 to Justify 2, the exact numbers that are in the Text Length Register and the Read Space Counter are used since they contain the quantities to be used for either the whole line or the second half column, as the case may be.

Figure 4C:
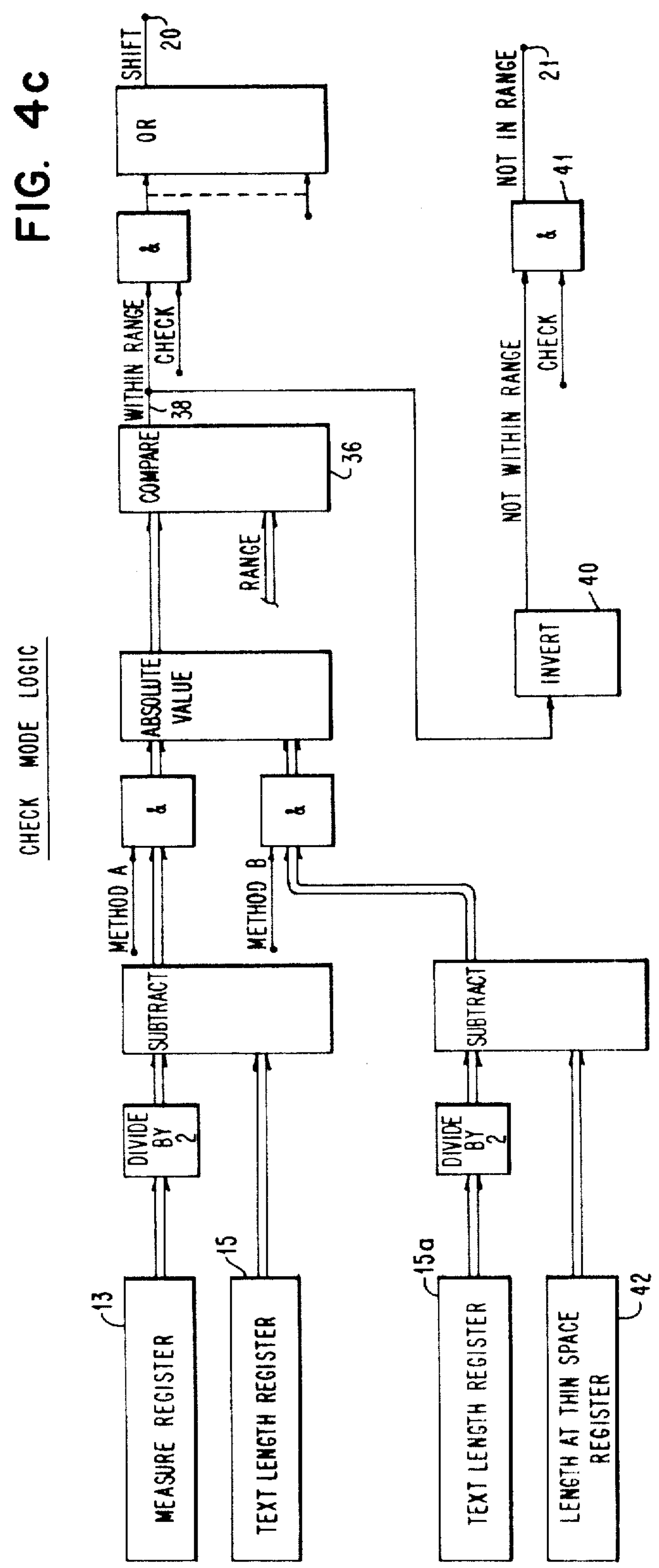

The next mode that occurs with Method A is the Check mode, FIG. 4c. This mode involves determining whether a Double Thin Space that the machine has detected in the Read 1 mode is in fact in the desired Range of the center of the measure. The system will take half the value in the Measure Register 13 and subtract from this the value in Text Length Register 15. This will give the distance from the center of the Measure. The absolute value of this difference is compared by Compare circuit 36 against the desired Range to generate a signal Within Range on line 38. If the machine is Within Range and in the Check mode, AND circuit 39 will generate a Shift signal which will take it into the first Justify Calculation mode. This assumes a symmetrical Range. However, by a nonsymmetrical Compare circuit the system can be set up to bias the Range in one direction or the other from the center.

The Not In Range signal which conditions the machine back to the Read 1 Latch is generated by inverting the Within Range signal by circuit 40 and adding that with the Check mode signal in AND circuit 41 to generate the reset signal at terminal 21. This causes the machine to return to the Read 1 mode.

Figure 4D:
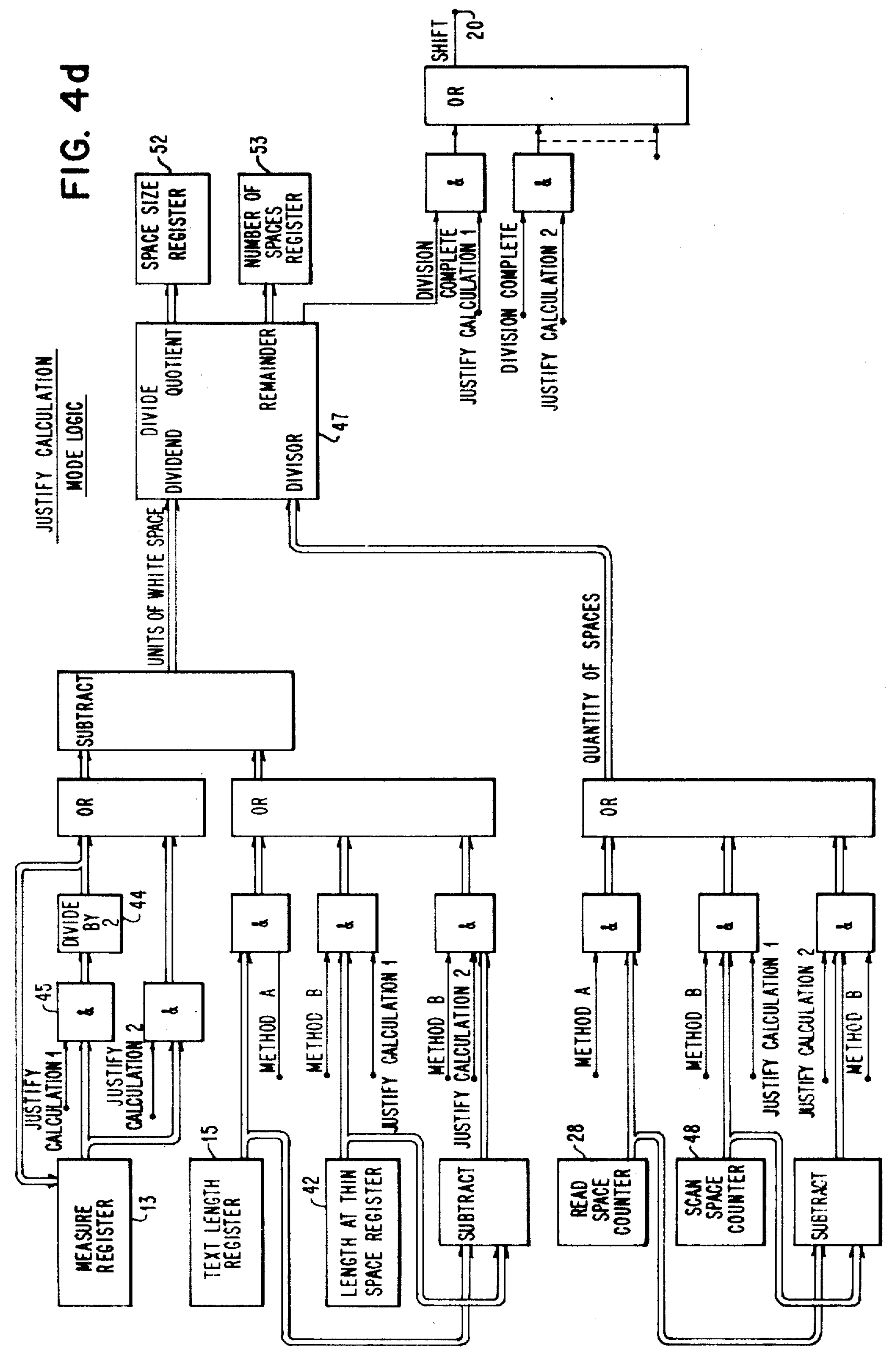

FIG. 4d shows the Justify Calculation Mode Logic for both Justify Calculation 1 and Justify Calculation 2. In Justify Calculation 1, the objective is to justify a half column and set up the machine to justify a half column in the second Justify Calculation. For this purpose, the Measure Register contents are divided by 2 in circuit 44 to provide a quantity that is used as the measure for the first Justify Calculation. Also, the result of this division is stored back in Measure Register 13 to provide a quantity that is used as a measure for the second Justify Calculation. If the first Justify Calculation is skipped, the proper measure is the full measure, but the machine does not go through the divide by two route because the Justify Calculation 1 signal is down into AND circuit 45. Thus, the full measure will be used in Justify 2 if Justify 1 is skipped. The white space to be distributed among Space codes consists of the difference between the measure that is used and the fixed length of text to be justified in this particular calculation. In Method A, the fixed length is always derived from Text Length Register 15, which in all cases will come into the Justify Calculation bearing the proper quantity to be used. The Text Length Register contents are subtracted from the appropriate measure to generate the units of white space. The other quantity that is needed for the calculation is the number of spaces over which this white space is to be distributed. For Method A, Read Space Counter 28 will always have the correct number of spaces. Divide block 47 performs the function of dividing the quantities of spaces into the units of white space and generating a quotient and a remainder which are used as inputs to the Transfer operation. Divide circuit 47 will at the end of the division routine generate a Division Complete signal which is used to generate the Shift signal from OR circuit 49 that shifts the machine out of the Justify Calculation mode into the appropriate Transfer Calculation mode.

The Transfer mode logic shown in FIG. *4e* moves characters from Input Block 8 through a Transfer Character Analysis circuit 9. In general, all of the characters, except spaces, are taken directly and placed in Output Block 10. The spaces are detected and are replaced by Space Characters generated by circuit 50 in response to a calculation that determines the space size. This is a function of the contents of Space Size Register 52 and the Number of Spaces register 53. The Space Size Calculation circuit 54 determines which space that the machine is working with, what its size should be, looks up an appropriate No-Print character to use to replace the Space code and places this appropriate character in Output Block 10. Characters placed in the Output Block are sent to the printer 4. When the Transfer is complete, the Transfer Logic will generate a Transfer Complete Signal on line 55 which will cause the machine to shift to one of the Read states.

Spaces for printer 4 consists of No-Print Characters with the appropriate width. No-Print is achieved by sending the Rotate and Tilt code for the individual character to the Printer along with a No-Print bit which activates a No-Print Interposer. This may be done by the printer translator, as set forth in the Castle, et al. application, referred to.

By the foregoing techniques, the system has detected any Double Thin spaces which are within an appropriate Range of the center of the measure of the line. The machine stops the input at the time a Double Thin Space of this variety has been detected. All test that has been read up to this point has been treated as a separate line. This line portion is placed in the output, and the remaining portion of the line is treated as another separate line. The two line portions are each justified on half the measure of the full column and are placed in adjacent positions.

Description of Method B

Method B differs from Method A in that the basis for determining whether the Double Thin Space is in the center is not the measure but is the actual length of the text in the line. This requires the determination of the length of the text in the entire line before any analysis of a Double Thin Space can occur. All the reading takes place in one Read mode as shown in FIG. *3a* and after all the reading is completed, if any Double Thin Spaces are detected, it is necessary to go back and scan the entire line to determine if any of these Double Thin Spaces are within the desired Range about the center of the text of the line. If during the Scan, a Double Thin Space is detected, the machine goes into a Check mode to check if the Double Thin is within the Range. If it is not, the system returns to the Scan mode and returns to Check whenever a Double Thin is detected. It is possible that none of the Double Thins were within the proper Range, in which case when the Line End is found during the Scan mode, the machine will skip directly to the Justify Calculation 2, as if there had been no Double Thins. If a Double Thin is found within the appropriate Range, the machine shifts from Check to Justify Calculation 1 and justifies the portion of the line up to that point. It then transfers that portion of the line to Output Block 10 and immediately proceeds with Justify Calculation 2 through the remainder of the line and then transfers the remainder of the line. If during the Read mode, no Double Thins at all are detected, it is possible to skip directly from Read to the Justify Calculation 2 mode. The Control logic for doing this is shown in FIG. *3b* and is similar to the logic in FIG. *2b*. The logic includes seven latches B1—B7. The main difference in the circuits of FIGS. *2b* and *3b* is in the the Sets and Resets necessary to go out of the usual Shift Register sequence. If during the Check mode, it is found that the Double Thin the machine is checking is not within the Range it is necessary to return to the Scan mode, so the Not in Range signal at terminal 21 resets the Check Latch and sets the Scan Latch. If in the Scan mode, a Line End is found, then there was no Double Thin within the appropriate Range in the line and it is necessary to jump immediately to the Justify Calculation 2 mode. A No Double Thin in Range signal at terminal 23 resets the Scan latch and sets the Justify Calculation 2 latch. If the Line End code is recognized without having found any Double Thin, and there is no Double Thin in the line, then the Read Latch is reset and the Justify Calculation 2 Latch set.

The implementation of the Read mode circuits is shown in FIG. *4a*. The major difference is that the Double Thin Detected signal is used to set a Double Thin Latch 26 which is not interrogated until the Line End code is found, that is, until the entire line has been read. When a Double Thin code is found to have occurred by Line End, the Shift signal is generated under control of AND circuit 33 which causes the machine to go into the Scan mode. If there is no Double Thin in the line, a Line End code and the inverse of the Double Thin signal at circuit 34 will cause a No Double Thin in Line signal to be generated at terminal 24 which will result in skipping directly to Justify Calculation 2.

The Scan mode, FIG. *4b*, is an additional 7 in which the characters from Input Block 8 are passed through the Input Analysis Logic 7 which does most of the same functions as in FIG. *4a*. Whenever a Double Thin is detected, the Double Thin Detected signal is generated and through AND circuit 37 will cause the machine to shift into the Check mode. Each character is analyzed for its width and the width is added to a Length At Thin Space Register 42. The Length At Thin Space Register 42 provides a number which is used later in the Justification Calculation for the first half of the line, if this is necessary. It is necessary to know the amount of fixed space that has been accumulated up to the point of a successful detection of a Double Thin. If it is eventually determined that there is no Double Thin in the Range, it is necessary to reset the Length At Thin Space Register since it does provide Input to the Justify Calculations. Spaces are also detected in the Input Analysis Logic 7 and are counted by the Scan Space Counter 48 storing the number of Spaces up to the point at which the Double Thin has is detected. Again, if there is no Double Thin in Range, this counter must be reset to provide input to the Justification Logic.

The No Double Thin in Range signal from AND circuit 57 will cause the machine to Skip directly to Justification Calculation 2 and is generated whenever a Line End code is found in the Scan. This means that the Scan reached all the way to the end of the line without finding a Double Thin that met the criteria of being within the Range. The Shift signal generated in the Shift circuit sends the machine into the Check mode from Scan mode. The Check mode for Method B differs from Method A in that instead of using half the measure as the quantity being compared against, half of the value in Text Length Register 15 is used. Also, instead of using the Text Length Register value as the quantity of Fixed Space to compare against this value, the system uses the Length at Thin Space value in Register 42. The subtraction, the absolute value, the compare, and other routines take place identically to Check mode for Method A.

The Justify Calculation in FIG. *4d* operates similarly to that of Method A with respect to use of the measure. The quantity to be subtracted from the measure to determine the units of white space is different. The Length at Thin Space Register is used as the Input for Justify Calculation 1. The Input for Justify Calculation 2 will be the value in Text Length Register 15 minus the value in Length at Thin Space Register 42. In other words, it is the remainder of the Length of the Line that has not already been justified in Justify Calculation 1. Since the subtraction always takes place in Justify Calculation 2, it is necessary, if Justify Calculation 1 was skipped, that the Length at Thin Space Register be reset, which was described in connection with Scan Mode logic.

Figure 4E:
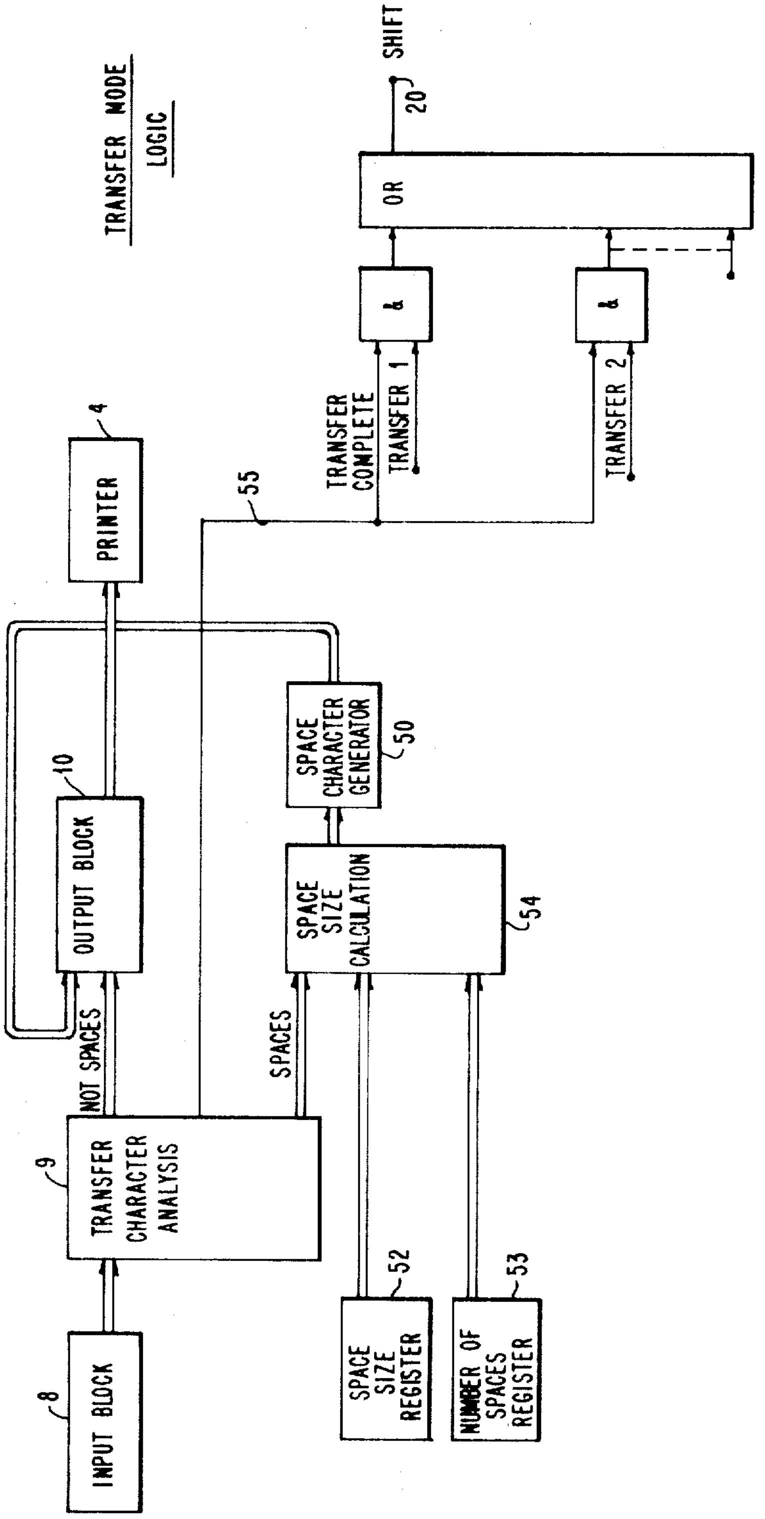

For Method A, in Justify Calculation 1, the Scan Space Counter 48 is used. In Justify Calculation 2, the remainder of the spaces in the line is determined by subtracting the contents of Scan Space Counter 48 from the contents of the Read Space Counter 28. In case the machine did not go through Justify Calculation 1, it is necessary that the Scan Space Counter be reset as shown in FIG. 4*b*. Otherwise, the Justify Calculation takes place exactly as in Method A and the Division Complete Signal is generated in FIG. 4*d* which causes a Shift to the Transfer mode in FIG. 4*e*. The Transfer mode is identical to that of Method A, with the Transfer Complete Signal causing the Shift signal to come up.

While the invention has been particularly shown and described with reference to several embodiments, it will be understood by those skilled in the art that various changes in form and detail may be made without department from the spirit and scope of the invention.

We claim:

1. A processing method for producing justified columnar data, comprising:

A. providing in a machine input signals representative of input data groups, each of said input data groups having at least a pair of data columns and arranged according to a first width schedule, said signals including a distinctive signal indicative of columnar terminations within each of said data groups;

B. converting in a machine the widths of said input data signals to width values according to a second width schedule;

C. detecting by machine each said columnar termination signal;

D. developing in a machine for each said data column columnar measure signals representative of a columnar measure of predetermined size from a stored data group measure based on said second width schedule, each of said columnar measures bearing a proportion to its related data group that is based on the number and size of all of the columns in its said related data group;

E. justifying in a machine each said column according to its related columnar measure; and F. providing in a machine signals representative of said justified columnar data according to said second width schedule to a utilizing device.

2. The method of claim 1, wherein:

signals in step A are derived by reading Teletypesetter (TTS) tape, based on a TTS width schedule; and measure development and justification in steps D and E are based on a non-TTS width schedule.

3. The method of claim 2, wherein:

signals in step F are provided to a printer to produce justified printed copy.

4. The method of claim 1, wherein:

signals indicative of columnar terminations are primarily representative of space characters that may appear at other positions in a data group besides columnar terminations; and detection at step C is confined to a selected range on either side of a predetermined column separation point to insure that said distinctive signals are detected only when they represent column terminations.

5. The method of claim 4, wherein:

columnar terminations are indicated by Double Thin space input signals.

6. The method of claim 4, wherein:

said data group measure represents the total width value of characters and white space in each data group.

7. The method of claim 6, wherein:

each said data group represents an individual line of data comprising a pair of data columns of substantially equal size; and said data group measure is a standard line measure and each said developed columnar measure is substantially one-half of said standard line measure.

8. The method of claim 7, wherein:

data is processed according to steps C—F on a columnar basis, the processing of each column being essentially independent of preceding or succeeding columns.

9. The method of claim 4, wherein:

said data group measure is developed concurrently with the provision of the input signals in each data group and reflects the total fixed width of characters only in a data group being processed.

10. The method of claim 9, wherein:

each said data group represents an individual line of data comprising a pair of data columns of substantially equal size; and said data group measure is a variable measure dependent upon the character width values in each line and each said developed columnar measure is also variable but substantially one-half of the related data group measure.

11. The method of claim 10, wherein:

the detection of columnar termination signals at step C and development of a columnar measure at step D involves the processing and storage of signals at step A on a line-by-line basis in order to develop said variable measure for each line; and processing of data at steps E and F is on a columnar basis within each line.

12. A processing method for producing justified columnar data, comprising:

A. providing in a machine input signals representative of input data groups, each of said input data groups having at least a pair of data columns, said signals including a distinctive signal indicative of columnar terminations within each of said data groups;

B. detecting in a machine each said columnar termination signal;

C. developing for each said data column columnar measure signals representative of a columnar measure of predetermined size from stored data group measure, each of said columnar measures bearing a proportion to its related data group that is based on the number and size of all of the columns in its said related data group;

D. justifying in a machine each said column according to its related columnar measure; and E. providing in a machine signals representative of said justified columnar data to a utilizing device.

13. The method of claim 12, wherein:

signals indicative of columnar terminations are primarily representative of space characters that may appear at other positions in a data group besides column terminations; and detection at step B is confined to a selected range on either side of a predetermined column separation point to insure that said distinctive signals are detected only when they represent columnar terminations.

14. The method of claim 13, wherein:

columnar terminations are indicated by Double Thin space input signals.

15. The method of claim 13, wherein:

said data group measure represents the total width value of characters and white space in each data group.

16. The method of claim 15, wherein:

each said data group represents an individual line of data comprising a pair of data columns of substantially equal size; and said data group measure is a standard line measure and each said developed columnar measure is substantially one-half of said standard line measure.

17. The method of claim 13, wherein:
said data group measure is developed concurrently with the provision of the input signals in each data group and reflects the total fixed width of characters only in a data group being processed.

18. The method of claim 17, wherein:
each said data group represents an individual line of data comprising a pair of data columns of substantially equal size; and
said data group measure is a variable measure dependent upon the character width values in each line and each said developed columnar measure is also variable but substantially one-half of the related data group measure.

19. The method of claim 18, wherein:
the detection of columnar termination signals at step B and development of a columnar measure at step C involves the processing and storage of signals at step A on a line-by-line basis in order to develop said variable measure for each line; and
processing of data at steps D and E is on a columnar basis within each line.

20. Apparatus for producing justified columnar data, comprising:
means providing input signals representative of input data groups, each of said input data groups having at least a pair of data columns and arranged according to a first width schedule, said signals including a distinctive signal indicative of columnar termination within each of said data groups;
means for converting the width values of said input data signals to width values according to a second width schedule;
means for detecting each said columnar termination signal;
means for developing for each said data column, columnar measure signals representative of a columnar measure of predetermined size from a data group measure previously stored according to said second width schedule, each of said columnar measures bearing a proportion to its related data group that is based on the number and size of all of the columns in its said related data group;
means for justifying each column according to its related columnar measure; and
means for providing signals representative of said justified columnar data according to said second width schedule to a utilizing device.

21. The apparatus of claim 20, wherein:
said means providing input signals is a media reader; and
said utilizing means is a printer.

22. The apparatus of claim 21, wherein:
said reader is a perforated tape reader that provides input signals based on a TTS width schedule; and
said apparatus otherwise operates on a non-TTS width schedule.

23. The apparatus of claim 20, wherein:
said data groups are lines of data each comprising a pair of columns separated by a Double Thin space.

24. The apparatus of claim 23, wherein:
said Double Thin spaces are present in said input data at positions other than at columnar terminations; and
wherein said detection means includes means to detect Double Thin spaces only within a range on either side of a preselected columnar termination location to insure detection of columnar terminations only.

25. The apparatus of claim 20, wherein:
said developing means includes means responsive to a data group measure of predetermined size that includes total fixed width and white space in a line of uniform length in developing columnar measures.

26. The apparatus of claim 25, wherein:
each data group comprises a line of data consisting of two data columns; and further comprising sequence control means including Read 1 means, Check means, Justify Calculations 1 means, Transfer 1 means, Read 2 means, Justify Calculation 2 means and Transfer 2 means and operable to control the sequence of operation and modes of said apparatus as follows:
A. activate said Read 1 means to read input signals, stop upon recognition of a columnar termination signal, change mode to activate,
B. said Check means to determine if columnar termination signal is within range about a predetermined column separation location, return to Read 1 mode if not in range, change mode to activate,
C. said Justify Calculation 1 means if columnar termination signal is within range and justify a first data column based on a half line measure and activate said Transfer 1 means for output, change mode to activate,
D. said Read 2 means to read remainder of data line, and when end of line is encountered change mode to activate Justify Calculation 2 means to justify remaining data column based on a half line measure and activate said Transfer 2 means for output.

27. The apparatus of claim 26, wherein:
said sequence control means includes means operable to change mode from Read 1 to Justify Calculation 2 in the event no columnar termination signal occurs in a data line or none occurs within range to justify entire line of data based on a full column measure.

28. The apparatus of claim 20, wherein:
said developing means includes means active in developing a columnar measure to concurrently develop said data group measure, the latter being of variable size and consisting of the total fixed width count only in individual data lines.

29. The apparatus of claim 28, wherein:
each data group comprises a line of data consisting of two data columns; and
further comprising sequence control means including Read means, Scan means, Check means, Justify Calculation 1 means, Transfer 1 means, Justify Calculation 2 means, and Transfer 2 means and operable to control the sequence of operation and modes of said apparatus as follows:
A. activate said Read means to read input signals in entire line to detect presence of columnar termination signals, if do occur, change mode to activate,
B. said Scan means to Scan entire line and when columnar termination signal occurs change mode to activate,
C. said Check means to determine if columnar termination signal is within range of a predetermined column separation location, if not, activate said Scan means for further scanning, if so, change mode to activate,
D. said Justify Calculation 1 means, justify first data column based on a half column measure and activate Transfer 1 means for output, change mode to activate,
E. Justify Calculation 2 means, justify second data column based on a half line measure and activate Transfer 2 means for output.

30. The apparatus of claim 29, wherein:
said sequence control means is operable to change mode from Scan mode directly to Justify Calculation 2 mode in the event no column termination signal occurs in a data line or from Check mode to Justify Calculation 2 mode if none is within proper range.

31. Apparatus for producing justified columnar data, comprising:
means providing input signals representative of input data groups, each of said input data groups having at least a pair of data columns, said signals including distinctive signal indicative of columnar termination within each of said data groups;
means for detecting each said columnar termination signal;
means for developing for each said column columnar measure signals representative of a columnar measure of predetermined size from a stored data group measure, each of said columnar measures bearing a proportion to its related data group that is based on the number and size of all the columns in its related data group;

means for justifying each column according to its related columnar measure; and means for providing signals representative of said justified columnar data to a utilizing device.

32. The apparatus of claim 31, wherein:

said data groups are lines of data each comprising a pair of columns separated by a Double Thin space.

33. The apparatus of claim 32, wherein:

said Double Thin spaces are present in said input data at positions other than at column terminations; and wherein said detection means includes means to detect Double Thin spaces only within a range on either side of a preselected columnar termination location to insure detection of columnar terminations only.

34. The apparatus of claim 31, wherein:

said developing means includes means responsive to a data group measure of predetermined size that includes total fixed width and white space in a line of uniform length in developing columnar measures.

35. The apparatus of claim 31, wherein:

said developing means includes means active in developing a columnar measure to concurrently develop said data group measure, the latter being of variable size and consisting of the total fixed width count only in individual data lines.